(12) United States Patent
Ross et al.

(10) Patent No.: US 8,417,452 B2
(45) Date of Patent: Apr. 9, 2013

(54) SYSTEM FOR PROVIDING INFORMATION TO AN OPERATOR OF A VEHICLE

(75) Inventors: Steven J. Ross, Livonia, MI (US); Edward P. Chrumka, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 781 days.

(21) Appl. No.: 12/543,761

(22) Filed: Aug. 19, 2009

(65) Prior Publication Data
US 2011/0046870 A1 Feb. 24, 2011

(51) Int. Cl.
*G08G 1/123* (2006.01)
(52) U.S. Cl. .. 701/532; 701/410; 701/533; 707/E17.107
(58) Field of Classification Search .................. 701/408, 701/410, 425, 438, 533, 538, 532; 705/14.64; 707/E17.107
See application file for complete search history.

(56) References Cited

U.S. PATENT DOCUMENTS

| | | | |
|---|---|---|---|
| 7,479,901 B2 * | 1/2009 | Horstemeyer | 340/994 |
| 2002/0098853 A1 | 7/2002 | Chrumka et al. | |
| 2005/0165639 A1 | 7/2005 | Ross et al. | |
| 2008/0306681 A1 | 12/2008 | Piwowarski et al. | |
| 2009/0247151 A1 * | 10/2009 | Kameyama | 455/426.1 |

* cited by examiner

*Primary Examiner* — Gertrude Arthur Jeanglaude
(74) *Attorney, Agent, or Firm* — Ingrassia Fisher & Lorenz, P.C.

(57) ABSTRACT

Methods and apparatus are provided for a system that provides information to an operator of a vehicle. The system includes, but is not limited to a call center that configured to provide the operator with route guidance to a location. The system also includes a plurality of internet websites. Each internet website relates to a vehicle lifecycle event and is configured to permit the operator to electronically transmit a location associated with the vehicle lifecycle event to the call center.

20 Claims, 5 Drawing Sheets

Fig-3

GMAC Mortgage

| City | Address | Phone |
|---|---|---|
| Plymouth | 123 Main Street | (734) 555-1000 |
| Troy | 789 Oak Blvd. | (248) 555-7500 |
| Royal Oak | 1212 Woodward Ave. | (248) 555-6565 |
| Ann Arbor | 6789 Grainger | (734) 555-1234 |
| Clinton Township | 369 Gratiot Ave. | (586) 555-8080 |
| Canton | 7654 Michigan Ave. | (734) 555-9000 |
| Garden City | 5678 Middlebelt | (734) 555-1278 |
| Mt. Clemens | 8191 Groesbeck Ave. | (586) 555-4567 |
| Clarkston | 5432 Dixie Highway | (248) 555-6789 |

GMAC Mortgage
1414 W. 14 Mile Road
Birmingham, MI 9
(248) 555-0000
SEND TO ONSTAR —— 102

SYSTEM FOR PROVIDING INFORMATION TO AN OPERATOR OF A VEHICLE

TECHNICAL FIELD

The technical field generally relates to a system for providing information to an operator of vehicle and more particularly with providing an operator of a vehicle with route guidance to locations related to various vehicle ownership lifecycle events.

BACKGROUND

Some currently available navigation systems provide a vehicle operator with the ability contact a call center from a vehicle to obtain in-vehicle route guidance to a location identified by the vehicle operator while situated in the vehicle. In many instances, however, it may be desirable to provide a location to the call center from a location other than the vehicle. For example, vehicle operators may visit multiple vehicle-related internet websites throughout the period in which they own a vehicle. Such internet websites may present address information to the vehicle operator where various vehicle-related services may be obtained. The operator must then write down, memorize, or otherwise record the address for subsequent transmission to the call center. For example, a vehicle owner shopping for a new vehicle may visit an internet website provided by a vehicle manufacturer to learn what vehicles are offered by the manufacturer and to determine the location of vehicle dealerships with such vehicles in stock.

In other non-limiting examples, a vehicle operator may visit internet websites relating to matters including the financing of vehicle purchases and the need for vehicle maintenance and/or repair service. It would be desirable to send the street addresses of such service providers directly from the service provider's internet website to the call center.

Thus, there is a need on the part of a vehicle manufacturer who provides such vehicle lifecycle services (or whose business affiliates provide such vehicle lifecycle services) to provide the vehicle operator with a means for sending service related locations directly from an internet website hosted by the vehicle manufacturer (or its affiliates) to the call center. Furthermore, other desirable features and characteristics will become apparent from the subsequent detailed description and the appended claims, taken in conjunction with the accompanying drawings and the foregoing technical field and background.

SUMMARY

A system is disclosed that provides information to an operator of a vehicle. In a first, non-limiting example, the system includes a call center that is capable of providing the operator with route guidance to a location. The system also includes multiple internet websites. The internet websites relate to respective vehicle lifecycle events. Each internet website is configured to permit the operator to electronically transmit a location associated with the respective vehicle lifecycle event to the call center.

In a second, non-limiting example, the system includes a call center that is capable of providing the operator with route guidance to an operator-specified location. The call center is also capable of maintaining an electronic compilation of operator-specified locations associated with the operator. The system also includes multiple internet websites. The internet websites relate to respective vehicle lifecycle events. Each internet website is configured to permit the operator to electronically transmit a location associated with the respective vehicle lifecycle event to the call center and the call center stores the location in the electronic compilation of locations associated with the operator.

In a third non-limiting example, the system includes a call center operated by a first business entity that is affiliated with a vehicle manufacturer. The call center is capable of providing an operator situated in a vehicle with route guidance to an operator-specified location. The system also includes an internet website operated by a second business entity that is affiliated with the vehicle manufacturer. The internet website relates to a vehicle life cycle event and is configured to perform searches for a location relating to the vehicle lifecycle event based on criteria defined by the user. The internet website is further configured to electronically transmit the location to the call center.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

It is to be understood that the term "affiliate" when used in conjunction with "vehicle manufacturer" includes, but is not limited to, a business entity related to the vehicle manufacturer such as a parent or sister company, a subsidiary of the vehicle manufacturer, a division of the vehicle manufacturer, a company with a right to control the vehicle manufacturer, a company over which the vehicle manufacturer has the right to exert control, an entity engaged in a joint venture with the vehicle manufacturer, and an entity engaged in a franchisee/franchisor relationship with the vehicle manufacturer. The term "affiliate" may be used interchangeable herein with the terms "related company" or "related entity" or "related business entity".

It is to be understood that the term "vehicle lifecycle event" refers to events typically occurring during the period starting with a vehicle owner's purchase of a vehicle, including his efforts to locate and evaluate the vehicle for purchase, and concluding with the vehicle owner's disposition of that vehicle. Vehicle lifecycle events include, but are not limited to, shopping for the vehicle, test driving the vehicle, purchasing the vehicle, financing the purchase of the vehicle, servicing the vehicle, repairing the vehicle, inspecting the vehicle, and selling, trading in, donating or otherwise discarding the vehicle.

It is to be understood that the term "vehicle owner" includes a person associated with the vehicle, such as, but not limited to, a driver of the vehicle, an occupant in the vehicle and an operator of the vehicle. The terms "vehicle owner" may be used interchangeably herein with the terms "user", "consumer", "customer", "operator", "subscriber" and/or "vehicle operator".

It is to be understood that the term "vehicle dealership" refers to a business establishment affiliated with the vehicle manufacturer that sells and/or services vehicles manufactured by the vehicle manufacturer. The term "vehicle dealership" may be used interchangeably herein with the term "dealership".

It is to be understood that the term "home vehicle dealership" refers to either a vehicle dealership where a vehicle owner purchased, leased, or otherwise obtained an interest in a vehicle, or to a vehicle dealership where the vehicle owner routinely returns to obtain service for the vehicle. The term "home vehicle dealership" may be used interchangeably herein with the terms "home dealership", "primary dealership" or "preferred dealership".

In one non-limiting solution to the problems discussed above, a vehicle manufacturer, or an affiliate of the vehicle manufacturer, may host multiple internet websites and/or websites having multiple web pages that relate to various services, products or other needs that a vehicle owner may require relating to a vehicle's life cycle. Each website, including websites that utilize speech enabled browsers, may be configured to allow the vehicle owner to search for products and/or services using criteria defined by the vehicle owner. Each website may contain an internet link to a call center that is configured to provide the vehicle owner with in-vehicle route guidance to locations identified by the vehicle owner. Using the internet link, the vehicle owner can send location information to the call center directly from the internet website that is displaying the search results. The call center can then provide the vehicle owner with route guidance, including audio centric route guidance and/or visually based route guidance, to the location when the vehicle owner is situated in the vehicle and ready to travel to the location. In this manner, the vehicle owner obviates the need to go to third party internet websites, or elsewhere, to procure written directions and/or other types of route guidance to the location.

In another non-limiting example, the system just described can be used by the vehicle owner to provide route guidance to someone other than the vehicle owner. For instance, a vehicle dealership in the business of selling vehicles may wish to allow a consumer to take a vehicle for an unaccompanied test drive. Using the system described above, the vehicle dealership can pre-set one or multiple locations for each vehicle offered for sale. The location of the dealership can also be pre-set to allow the consumer to easily return to the vehicle dealership at the conclusion of the test drive.

In another non-limiting example, the system described above can be used by a vehicle owner when services or products are offered to the vehicle owner. For instance, the call center may be configured to monitor the vehicle for defects, mechanical problems, recalls and/or service needs. The call center may send the vehicle owner an alert, such as through an email, advising the vehicle owner that service is needed. The email may contain the address of the vehicle owner's home vehicle dealership and may also contain a link to an internet website where the vehicle owner can obtain further information about his vehicle's condition. The vehicle owner may also be able to forward the address for the home vehicle dealership to the call center or, alternatively, the vehicle owner may be able to locate a vehicle dealership or other service provider which he may then, through the internet link described above, forward the location of the service center to the call center.

A greater understanding of the system described above can be obtained through a review of the illustrations accompanying this disclosure together with the detailed description below. In addition, the disclosures contained in pending patent application Ser. Nos. 12/113,142 and 11/758,213 are each incorporated herein by reference in their entirety.

Figure 1:
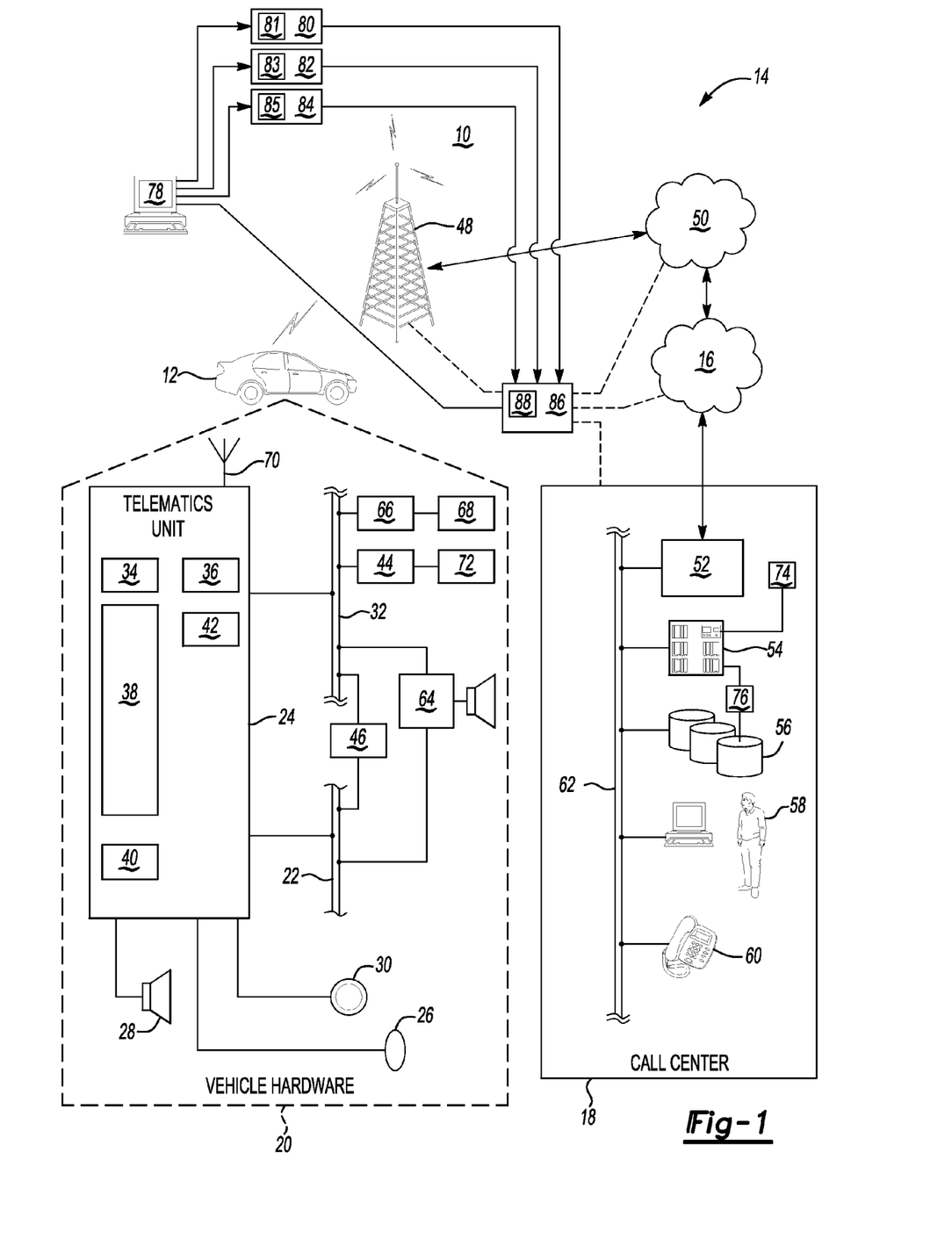
FIG. 1 is a schematic view of an example of a system that is configured to provide route guidance to facilitate events occurring during a vehicle ownership lifecycle.

With reference to FIG. 1 there is shown an example of a communication system 10 that may be used to address the problems described above. Communication system 10 generally includes a vehicle 12, a wireless carrier system 14, a land network 16 and a call center 18. The following paragraphs provide an overview of one exemplary example of communication system 10, however, it is to be understood that other systems and architectures not shown here, but which fall within the scope of this disclosure, may also be employed to resolve the problems described above.

Vehicle 12 is preferably a mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28 and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70 and a navigation unit containing a GPS chipset/component 42. In one example, the wireless modem 36 is comprised of a computer program and/or set of software routines executing within electronic processing device 38.

The telematics unit 24 provides too many services to list them all, but several examples include: turn-by-turn directions and other navigation-related services provided in conjunction with the GPS chipset/component 42; airbag deployment notification and other emergency or roadside assistance-related services provided in connection with various crash and or collision sensor interface modules 66 and crash sensors 68 located throughout the vehicle. Infotainment-related services where music, Web pages, movies, television programs, videogames and/or other content is downloaded by an infotainment center 46 operatively connected to the telematics unit 24 via vehicle bus 32 and audio bus 22. In one example, downloaded content is stored for current or later playback.

Again, the above-listed services are by no means an exhaustive list of all the capabilities of telematics unit 24, as should be appreciated by those skilled in the art, but are simply an illustration of some of the services that the telematics unit is capable of offering. It is anticipated that telematics unit 24 will include a number of known components in addition to those listed above.

Vehicle communications preferably use radio transmissions to establish a voice channel with wireless carrier system 14 so that both voice and data transmissions can be sent and received over the voice channel. Vehicle communications are enabled via the cellular chipset/component 34 for voice communications and a wireless modem 36 for data transmission. In order to enable successful data transmission over the voice channel, wireless modem 36 applies some type of encoding or modulation to convert the digital data so that it can communicate through a vocoder or speech codec incorporated in the cellular chipset/component 34. Any suitable encoding or modulation technique that provides an acceptable data rate and bit error can be used with the present method. Dual mode antenna 70 services the GPS chipset/component and the cellular chipset/component.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides verbal output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons or controls 30 for enabling a vehicle occupant to activate or engage one or more of the components of vehicle hardware 20. For example, one of the controls 30 can be an electronic pushbutton used to initiate voice communication with call center 18 (whether it be a live advisor 58 or an automated call response system). In another example, one of the controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides AM and FM radio, CD, DVD, and multimedia functionality independent of the infotainment center 46. Audio component 64 may contain a speaker system, or may utilize speaker 28 via arbitration on vehicle bus 32 and/or audio bus 22.

The vehicle crash and/or collision sensor interface modules 66 are operatively connected to the vehicle bus 32. The crash sensors 68 provide information to the telematics unit via the crash and/or collision sensor interface modules 66 regarding the severity of a vehicle collision, such as the angle of impact and the amount of force sustained.

Vehicle sensors 72, connected to various sensor interface modules 44 are operatively connected to the vehicle bus 32. Examples of vehicle sensors include but are not limited to gyroscopes, accelerometers, magnetometers, emission detection and/or control sensors, and the like. Example sensor interface modules 44 include powertrain control, climate control, and body control, to name but a few.

Wireless carrier system 14 is preferably a cellular telephone system or any other suitable wireless system that transmits signals between the vehicle hardware 20 and land network 16. According to one non-limiting example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/based station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones and connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, live advisors 58, as well as a variety of other telecommunication and computer equipment 60 that is known to those skilled in the art. These various call center components are preferably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of equipment 60 for demodulation and further signal processing. The computer equipment 60 preferably includes an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

As shown, server 54 may be associated with software 74 that supports one or more online destination locating programs that are accessible to subscribers via the internet Server 54 and software 74 work together to create, for a user, a personalized online, vehicle accessible electronic compilation of locations, hereinafter referred to as address book 76. Entries into address book 76 may be consolidated and prioritized in any manner suitable to the user. Once generated, address book 76 may be stored via server 54 and may be accessible to the user while situated in vehicle 12. Address book 76 may be downloaded to database 56 located at call center 18 and to telematics unit 24 located in vehicle 12. As such, address book 76 may be accessed via the live advisors 58, the telematics unit buttons, knobs, switches, and keyboards, and/or controls.

The user may also access address book 76 over the internet by accessing a server 86 associated with call center 18. Server 86 may be connected to call center 18 directly, or through a connection with cell tower 48, base station 50 and/or land network 16, as indicated by phantom lines. Server 86 may host an internet website 88 to facilitate user access to address book 76 as well as to other services provided by call center 18.

The user may access a personalized account at internet website 88 by inputting user-specific information. The user-specific information may include, for example, the user's name, a password, an account number, and/or any other identifying information. Personalized account information, including the user-specific information, may be stored and accessed by call center 18 or by server 86. In one example, a user may access internet website 88, log in with the user-specific information, and then may be permitted to access locations stored in address book 76 and/or may be permitted to add locations to address book 76.

Communication system 10 further includes servers 80, 82 and 84 which are operatively connected to websites 81, 83, and 85 which are accessible over the internet. It should be understood that a greater or lesser number of servers and websites may be employed without departing from the teachings of the present system. Servers 80, 82, and 84 and websites 81, 83, and 85 may each be owned and operated by a single vehicle manufacturer and/or by its affiliates. Users may access websites 81, 83, and 85 using any internet enabled device such as, but not limited to, a personal computer 78.

Websites 81, 83, and 85 may be used to present users with goods and services offered by the vehicle manufacturer and/or its affiliates which are related to the purchase, ownership, maintenance, operation and other vehicle lifecycle events of vehicle 12. The user may be able to use websites 81, 83, and 85 to conduct searches for locations where such goods and services may be provided.

Websites 81, 83 and 85 may include an internet link that enables the user to transmit the location that was obtained during the search to call center 18. In some examples, a user may be able to store the location in the user's address book 76. In one non-limiting example, the internet link may route the location through the server 86. To successfully upload the location to address book 76, the user may be required to enter the user's personalized account information whereupon server 86 may forward the location to call center 18 for storage.

Upon receipt at call center 18, switch 52 may route the location along bus 62 to server 54. Server 54 and software 74 may then cooperate to add the location to address book 76. Once stored in address book 76, a vehicle operator may selectively procure in-vehicle route guidance to the location at a time of his or her choosing. In other examples, the vehicle operator may receive a prompt or audible alarm or other alert which advises the vehicle operator that a new location has been added to address book 76.

It should be understood by those of ordinary skill in the art that the teachings of the present system are not limited to use with internet websites that are only related to vehicle lifecycle events. For instance, in other examples, websites 81, 83, and 85 may be configured to perform searches for locations of any type and variety. In accordance with the teachings of the present system, the user may be permitted to forward such locations to call center 18 for storage in address book 76.

In one implementation of the above described system, server 80 and website 81 may be owned, operated or otherwise sponsored by a vehicle manufacturer or an affiliate of the vehicle manufacturer (for example, General Motors Corporation or Chevrolet). In one non-limiting example, website 81 may be configured to allow the user to search for vehicles offered for sale by the vehicle manufacturer. In some instances, the user is enabled to "build" a vehicle of his choosing by identifying desirable features. Typical selection options include vehicle brand, model, engine configuration, trim level, options packages and colors. Once a user has "built" the vehicle, the user may then be presented with an option to locate a vehicle dealership. If selected, the user may then be presented with a listing of vehicle dealerships having the vehicle that the user "built", or a similarly appointed vehicle, in stock. The listing of vehicle dealerships may include an address for each vehicle dealership as well as other contact information. In another non-limiting example, website 81 may be configured to allow the user to input geographical data and obtain a listing of vehicle dealerships without first requiring the user to "build" a vehicle.

Figure 2:
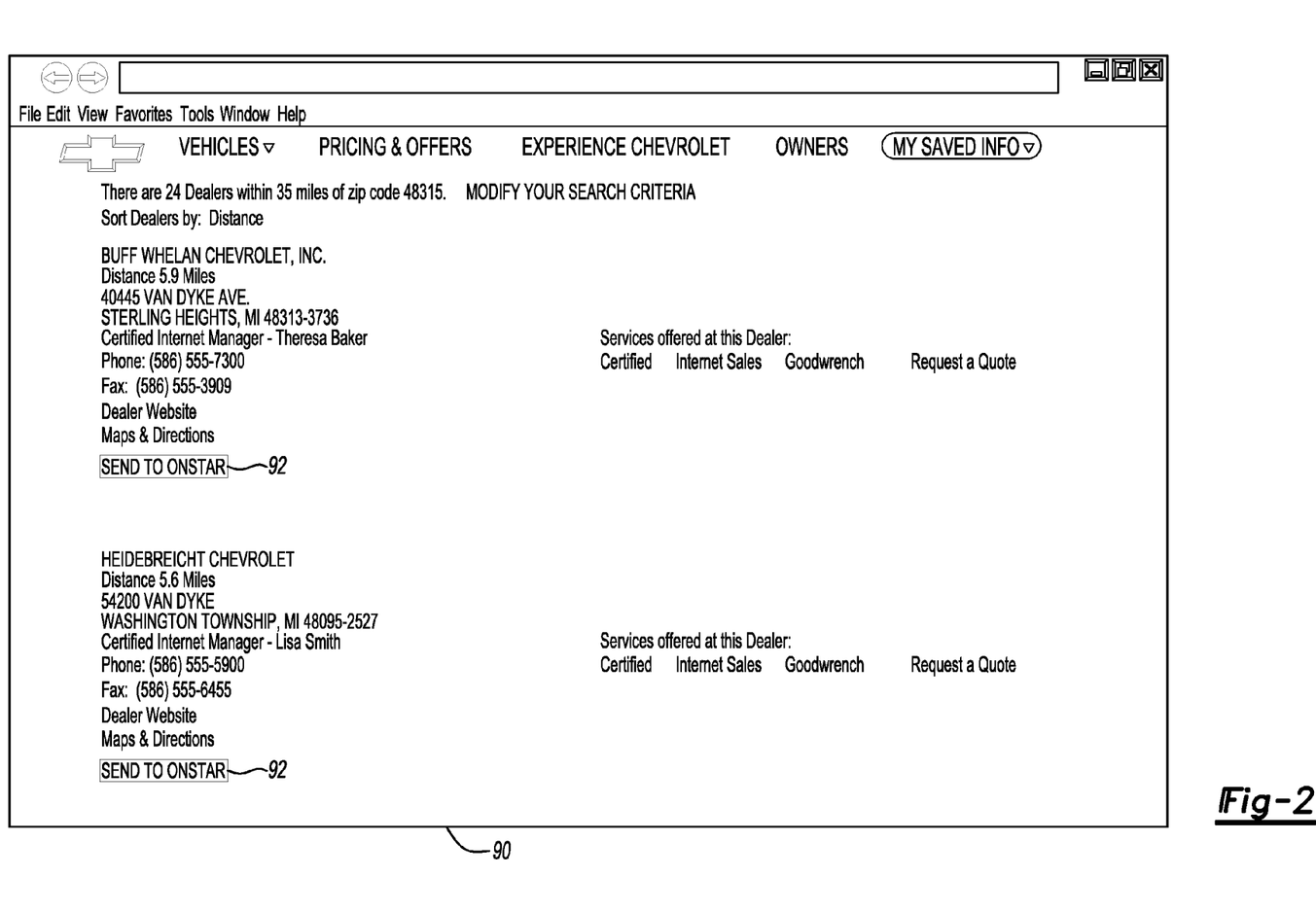
FIG. 2 illustrates an internet web page used in a first non-limiting implementation of the system depicted in FIG. 1.

With respect to FIG. 2, an exemplary web page 90 is presented. As illustrated, web page 90 contains a portion of a listing of vehicle dealerships. Each dealership in the listing is identified by name. A street address and other contact information is also provided for each vehicle dealership. Each listing also includes an internet link 92 which, if selected, will enable the user to forward the street address to address book 76 in the manner described above. In some examples, the additional contact information, such as a phone number, an email address and/or a website address for the vehicle dealership may also be uploaded to address book 76.

During the user's next vehicle usage, the vehicle dealership street address will be accessible to the user and the user may be able to obtain route guidance to the selected vehicle dealership(s). In some implementations, the user may be prompted by vehicle hardware 20 through an audible or visible alert, that a new location has been uploaded to address book 76.

Figure 3:
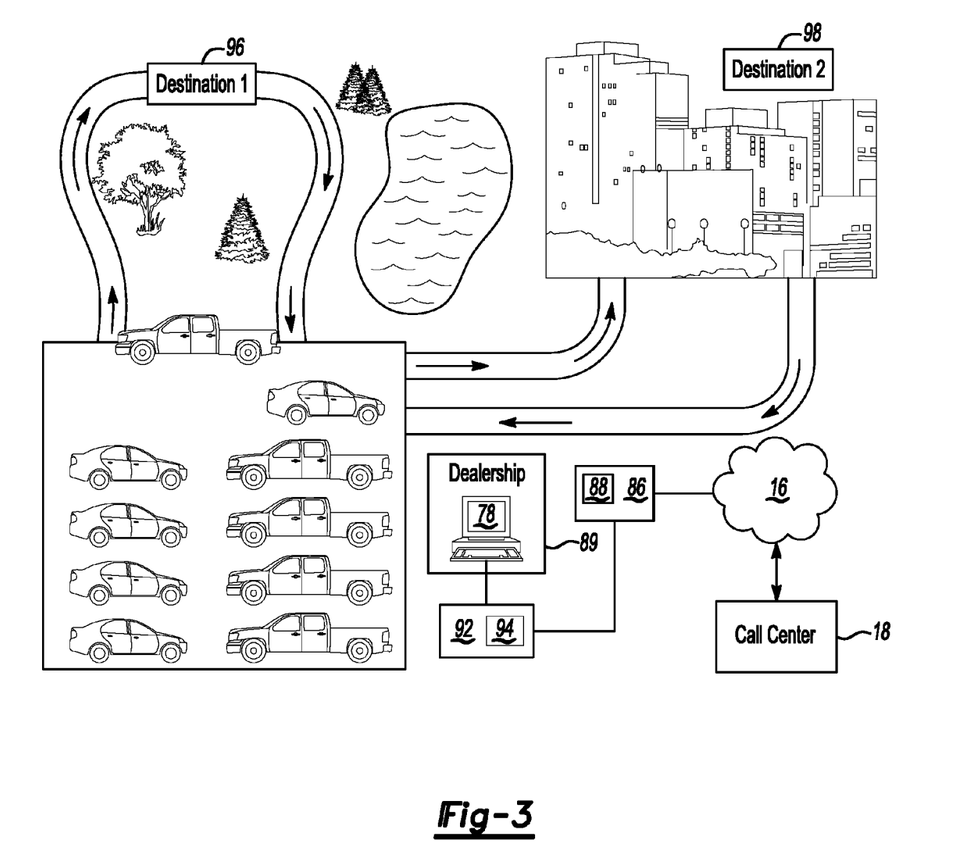
FIG. 3 is a schematic view illustrating a second non-limiting implementation of the system depicted in FIG. 1.

With respect to FIG. 3, a schematic view is presented illustrating how communication system 10 can be employed to facilitate a consumer's ability to take a test drive that starts and ends at vehicle dealership 89. Frequently, when a consumer shops for new vehicle, the consumer may have to travel to vehicle dealerships that are outside of the consumer's immediate geographic area. Consequently, the consumer may be required to test drive the vehicle in an area unfamiliar to the consumer. Communication system 10 can be employed to ensure that the consumer does not get lost during a test drive.

Using personal computer 78, the vehicle dealership can access a server 92 which hosts internet website 94. Server 92 may be co-located with vehicle dealership 89 and dedicated for usage exclusively by vehicle dealership 89. In other implementations, server 92 may be located remotely from vehicle dealership 89 and may be accessible to other dealerships. Server 92 may contain a plurality of predetermined test drive destinations for a plurality of vehicle dealerships. Internet website 94 may be configured to permit vehicle dealership 89, as well as other vehicle dealerships, to search for desirable predetermined test drive destinations. Internet website 94 may also be configured to allow vehicle dealership 89 to add new test drive destinations or to modify existing test drive destinations.

Once a suitable test drive location has been selected, vehicle dealership 89 may then select an internet link available at internet website 94 which transmits the test drive destination to server 86 for uploading to one or more address books 76 which may be associated with a respective one or more of the vehicles available for sale by vehicle dealership 89. In the same way, vehicle dealership 89 may also upload its own street address to address book 76.

By uploading both a predetermined test drive destination and the address for vehicle dealership 89, a user test driving a vehicle offered for sale by vehicle dealership 89 can avoid getting lost during the test drive. The user need only utilize vehicle hardware 20 to contact call center 18 for guidance to the predetermined test drive destination. Once the user is ready to return to the vehicle dealership, the user may again utilize vehicle hardware 20 to contact call center 18 for guidance back to the vehicle dealership.

Communication system 10 can also be used to highlight various attributes for the vehicles offered for sale at vehicle dealership 89. In one non-limiting example, the vehicle dealership may designate a first predetermined test drive destination 96 for vehicles of a first type (for example, a sport utility vehicle) and may designate a second predetermined test drive destination 98 for vehicles of a second type (for example, a hybrid electric compact sedan). In this example, first predetermined test drive destination 96 may take the first type of vehicle to or through a geographic region, such as a state park, where certain attributes unique to the first type of vehicle (for example, off-road capabilities) can be amply demonstrated. Similarly, second predetermined test drive location 98 may take the second type of vehicle to or through a geographic region, such as an urban area, where certain attributes unique to the second type of vehicle (for example, fuel efficiency) can be amply demonstrated. In other implementations, cooperation between vehicle hardware 20 and call center 18 may provide a driver with audible commentary and narration during the test drive to draw the driver's attention to the various attributes and advantages provided by the vehicle being test driven.

In many instances, the purchase of a new vehicle entails the procurement of financing. Communication system 10 can assist a consumer in this endeavor. In a non-limiting example, server 82 and website 83 may be owned, operated or otherwise sponsored by a lending institution that is affiliated with a vehicle manufacturer (for example, General Motors Acceptance Corporation). In one non-limiting example, website 83 may be configured to allow the user to search for branch offices of the lending institution using user specified criteria such as, but not limited to, geographic information. The listing of branch offices may include an address for each branch office as well as other contact information.

Figure 4:
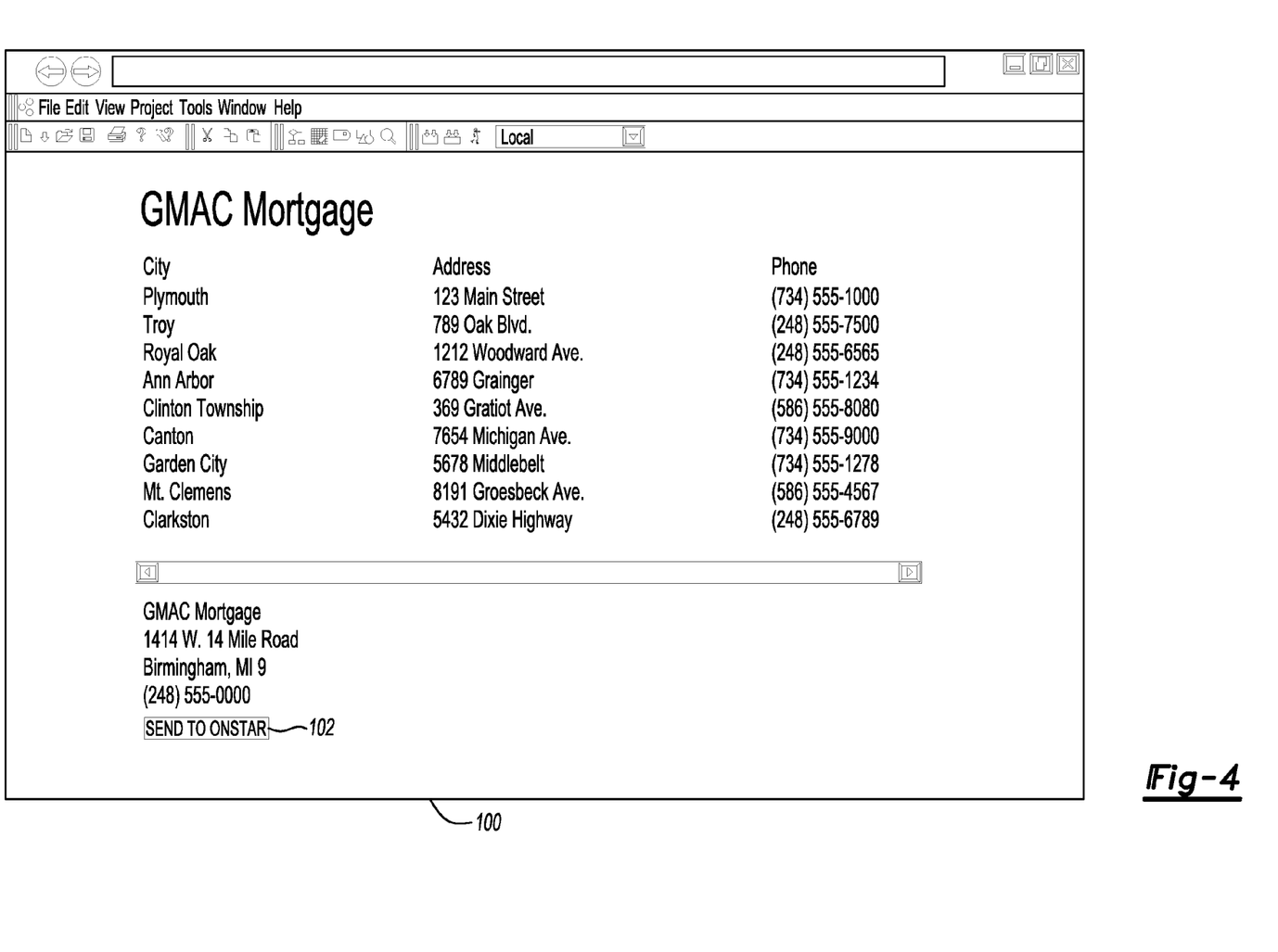
FIG. 4 illustrates an internet web page used in a third non-limiting implementation of the system depicted in FIG. 1.

With respect to FIG. 4, an exemplary web page 100 is presented. As illustrated, web page 100 contains a portion of a listing of branch offices for a lending institution. Branch office in the listing is identified by name. A street address and other contact information are also provided for each branch office. Each listing also includes an internet link 102 which, if selected, will enable the user to forward the street address to address book 76 in the manner described above. In some examples, the additional contact information, such as a phone number, an email address and/or a website address for the vehicle dealership may also be uploaded to address book 76.

During the user's next usage of his vehicle, the branch office street address will be accessible to the user through interaction with call center 18. In some implementations, the user may be prompted by the vehicle hardware 20 through an audible or visible alert, that a new location has been uploaded to address book 76.

Figure 5:
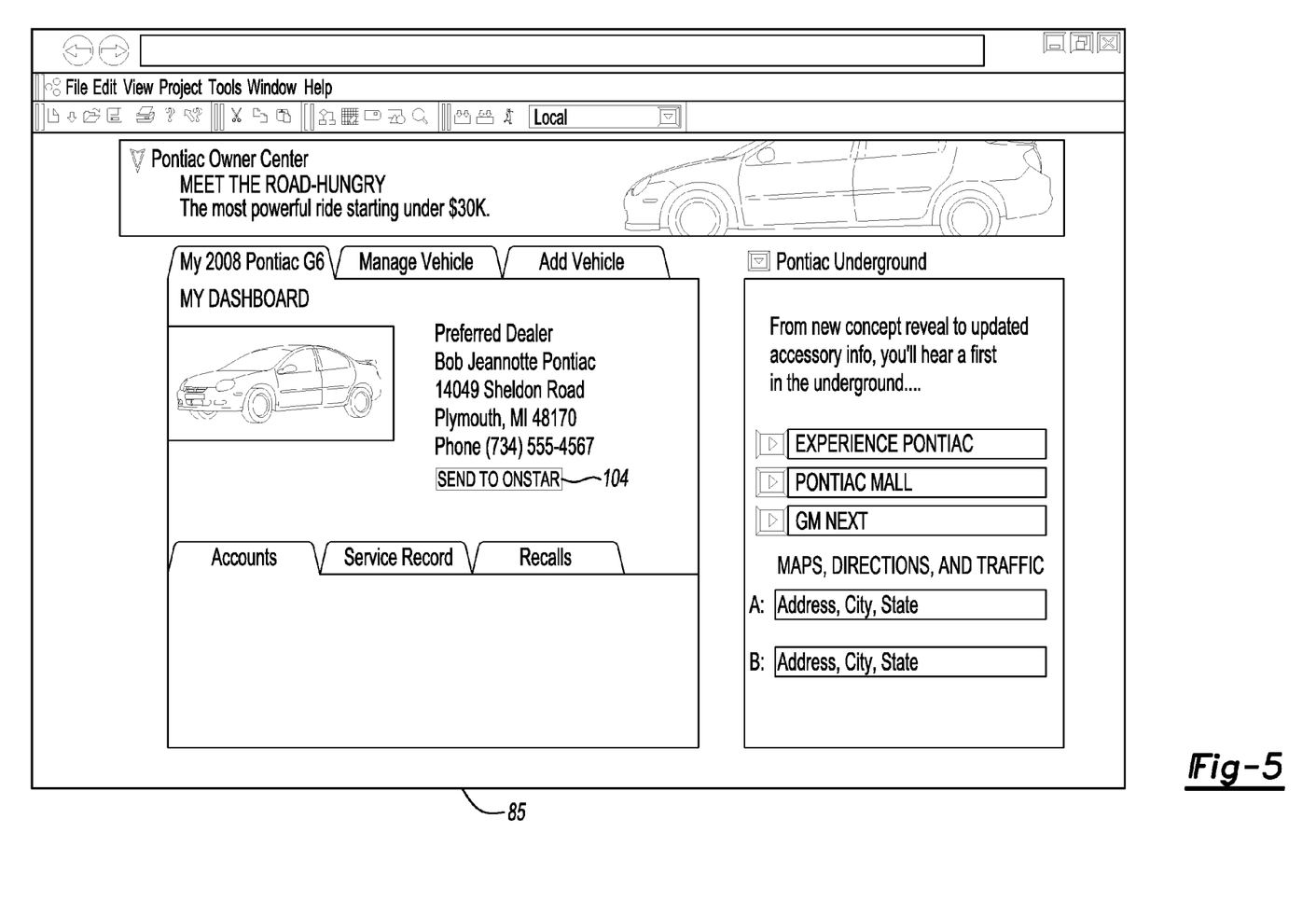
FIG. 5 illustrates an internet web page used in a fourth non-limiting implementation of the system depicted in FIG. 1.

With regard to FIG. 5, throughout the period in which the user owns/possess a vehicle, the vehicle will require a variety of maintenance and other services. For example, a vehicle will periodically require oil changes, tire rotation, and new brake pads to cite just a few examples. A vehicle owner may require third party assistance to ascertain when a vehicle requires service. Further, the vehicle owner may prefer to take the vehicle to a service provider, such as a vehicle dealership, to have such services performed rather than to perform the services themselves. Communication system 10 can assist a vehicle owner with these items.

In a non-limiting example, call center 18 may be configured to perform automated periodic assessments of a subscriber's vehicle to monitor the vehicle's need for service. Server 84 may be in communication with call center 18 and may receive information from call center 18 relating to a vehicle's maintenance status. In some implementations, server 84 and website 85 may be owned, operated or otherwise sponsored by an affiliate or contractual partner of the vehicle manufacturer.

Website 85 may be accessible to a vehicle owner over the internet and may be configured to present vehicle status information to the vehicle owner. A vehicle owner may access website 85 over the internet to learn of the vehicle's maintenance and service needs, or to learn other information pertaining to the vehicle. Website 85 may be configured to permit the vehicle owner to search for vehicle dealerships or other service centers and to obtain the addresses for such vehicle dealerships and suitable service centers. In some examples, website 85 may also be configured to proffer the address for a preferred vehicle dealership.

Website 85 may be further configured to include an internet link 104. Internet link 104 permits a vehicle owner to transmit the address for the vehicle dealership or suitable service center to call center 18 for storage in address book 76. Route guidance to the selected vehicle dealership or suitable service center will be available to the vehicle operator during the next vehicle usage.

In some implementations, server 84 may be configured to transmit an email message to the vehicle owner to alert the vehicle owner of the need for service. To facilitate the vehicle owner's ability to procure the necessary service, the email message may include an internet link to website 85 where the vehicle owner may locate a service provider and then upload location information to phone book 76. In still other implementations, call center 18 may provide notice of the need for service to the vehicle operator while the vehicle operator is situated in the vehicle through an alarm or other alert message.

In the manner described above, a vehicle manufacturer can provide a consumer with an enhanced vehicle ownership experience. For example, a vehicle manufacturer such as General Motors Corporation (GM), can provide a convenient way for its customers to obtain a variety of goods and services throughout the customer's vehicle ownership experience by having a first business entity that is affiliated with GM, such as a telematics service provider, operate a call center that can provide GM's customers with turn by turn route guidance. A second business entity affiliated with GM, such as Chevrolet, and a third business entity affiliated with GM, GMAC, may operate internet websites that advertise goods and services to customers of GM. The Chevrolet and GMAC internet websites may each contain one or more links that allow the customer to send locations relating to Chevrolet and GMAC's goods and services from the respective internet website to the call center. The call center may subsequently provide the customers with turn-by-turn navigation to those locations. Such convenience enhances the customer's vehicle ownership experience and a system that provides such convenience enables GM to better serve its customers.

While at least one non-limiting example has been presented in the foregoing detailed description, it should be appreciated that a vast number of variations exist. It should also be appreciated that the example or examples described above are merely exemplary, and are not intended to limit the scope, applicability, or configuration in any way. Rather, the foregoing detailed description will provide those skilled in the art with a convenient road map for implementing the example or examples. It should be understood that various changes can be made in the function and arrangement of elements without departing from the scope as set forth in the appended claims and the legal equivalents thereof.

What is claimed is:

1. A system for providing information to an operator of a vehicle, the system comprising:
   a call center configured to provide the operator with route guidance to an operator-specified location; and
   a plurality of internet websites, each relating to a respective vehicle lifecycle event and configured to permit the operator to electronically transmit a location associated with the respective vehicle lifecycle event to the call center.

2. The system of claim 1 wherein one of the plurality of internet websites is configured to perform searches for the location based on criteria defined by a user and to electronically transmit the location to the call center.

3. The system of claim 2 wherein the one of the plurality of internet websites is configured to locate a suitable vehicle dealership and to electronically transmit an address for the suitable vehicle dealership to the call center.

4. The system of claim 2 wherein the one of the plurality of internet websites is configured to locate a suitable lending institution and to electronically transmit an address for the suitable lending institution to the call center.

5. The system of claim 2 wherein the one of the plurality of internet websites is configured to provide information regarding a vehicle's service needs, to locate a suitable vehicle service center, and to electronically transmit an address for the suitable vehicle service center to the call center.

6. The system of claim 5 wherein the call center is further configured to transmit an alert to the operator to advise the operator to proceed to the suitable vehicle service center for service.

7. The system of claim 5 wherein the one of the plurality of internet websites is configured to automatically select a suitable service center for a vehicle owner.

8. The system of claim 1 wherein one of the plurality of internet websites is further configured to permit a vehicle dealership to electronically transmit a test drive destination to the call center and wherein the call center is further configured to associate the test drive destination with a vehicle offered for sale by the vehicle dealership.

9. The system of claim 8 wherein the one of the plurality of internet websites is further configured to permit the vehicle dealership to electronically transmit an address for the vehicle dealership to the call center and wherein the call center is further configured to associate the address for the vehicle dealership with the vehicle offered for sale by the vehicle dealership, whereby the call center's provision of the route guidance to the test drive destination and back to the vehicle dealership facilitates a customer's ability to test drive the vehicle offered for sale and to return to the vehicle dealership.

10. The system of claim 8 wherein the one of the plurality of internet websites is configured to permit the vehicle dealership to electronically transmit a plurality of test drive destinations to the call center, and wherein the call center is further configured to associate each test drive destination of the plurality of test drive destinations with a respective vehicle model offered for sale at the vehicle dealership.

11. A system for providing information to an operator of a vehicle, the system comprising:
   a call center configured to provide the operator with route guidance to an operator-specified location and to maintain an electronic compilation of operator-specified locations associated with the operator; and
   a plurality of internet websites, each relating to a respective vehicle lifecycle event and configured to permit the operator to electronically transmit a location associated with the respective vehicle lifecycle event to the call center,
   wherein the call center is further configured to store the location in the electronic compilation of locations associated with the operator.

12. The system of claim 11 wherein one of the plurality of internet websites is configured to perform searches for the location based on criteria defined by a user and to electronically transmit the location to the call center.

13. The system of claim 12 wherein the one of the plurality of internet websites is configured to locate a suitable vehicle dealership and to electronically transmit an address for the suitable vehicle dealership to the call center.

14. The system of claim 12 wherein the one of the plurality of internet websites is configured to locate a suitable lending institution and to electronically transmit an address for the suitable lending institution to the call center.

15. The system of claim 12 wherein the one of the plurality of internet websites is configured to provide information regarding a vehicle's service needs, to locate a suitable vehicle service center, and to electronically transmit an address for the suitable vehicle service center to the call center.

16. The system of claim 15 wherein the call center is further configured to transmit an alert to the operator to advise the operator to proceed to the suitable vehicle service center for service.

17. The system of claim 15 wherein the one of the plurality of internet websites is configured to automatically select a previously selected service center from the electronic compilation of locations.

18. The system of claim 11 wherein one of the plurality of internet websites is further configured to permit a vehicle dealership to electronically transmit a test drive destination to the call center and wherein the call center is further configured to store the test drive destination in the electronic compilation of locations associated with a vehicle offered for sale by the vehicle dealership.

19. The system of claim 18 wherein the one of the plurality of internet websites is further configured to permit the vehicle dealership to electronically transmit an address for the vehicle dealership to the call center and wherein the call center is further configured to store the address for the vehicle dealership in the electronic compilation of locations associated with the vehicle offered for sale by the vehicle dealership whereby the call center's provision of the audible route guidance to the test drive destination and back to the vehicle dealership facilitates a customer's ability to test drive the vehicle offered for sale and to return to the vehicle dealership.

20. A system for providing information to an operator of a vehicle, the system comprising:
   a call center operated by a first business entity affiliated with a vehicle manufacturer, the call center being configured to provide the operator situated in the vehicle with route guidance to an operator-specified location; and
   an internet website operated by a second business entity affiliated with the vehicle manufacturer, the internet website relating to a vehicle life cycle event and being configured to perform searches for a location based on criteria defined by the operator, the location relating to the vehicle life cycle event, and the internet website being further configured to electronically transmit the location to the call center.

* * * * *